Figure 1:
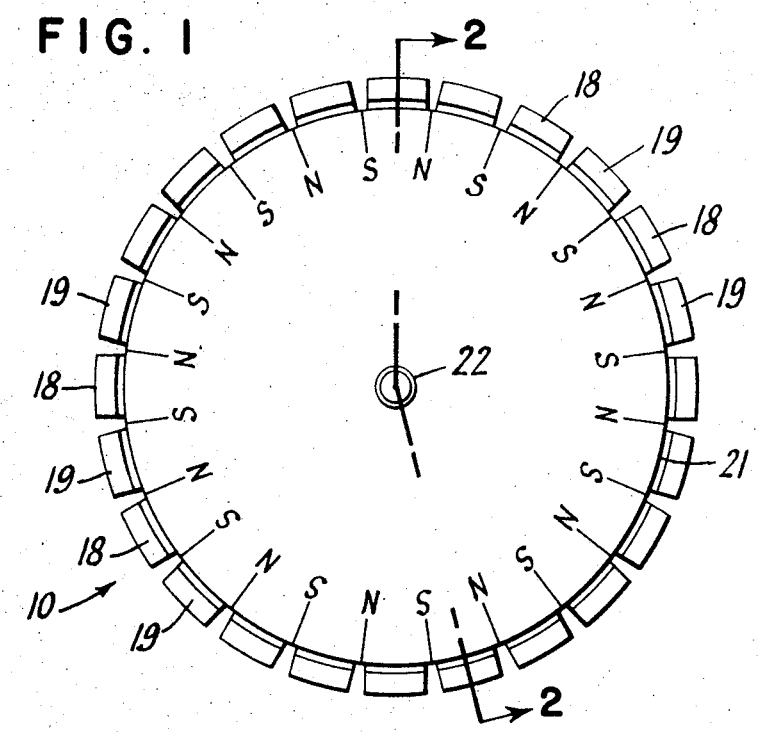

United States Patent [19]
Morley

[11] 3,746,900
[45] July 17, 1973

[54] SYNCHRONOUS MOTOR WITH IMPROVED STARTING CHARACTERISTICS

[75] Inventor: Edwin R. Morley, Two Rivers, Wis.

[73] Assignee: AMF Incorporated, White Plains, N.Y.

[22] Filed: Mar. 1, 1972

[21] Appl. No.: 230,616

[52] U.S. Cl............ 310/41, 310/156, 310/164
[51] Int. Cl. .............................................. H02k 7/10
[58] Field of Search............ 310/156, 259, 162–164, 310/41

[56] References Cited
UNITED STATES PATENTS

| | | | |
|---|---|---|---|
| 3,535,571 | 10/1970 | Heinzen | 310/257 X |
| 3,253,169 | 5/1966 | Haydon et al. | 310/162 X |
| 3,092,743 | 6/1963 | Van Utt et al. | 310/164 X |
| 3,302,046 | 1/1967 | Brandwijk | 310/156 X |
| 3,231,770 | 1/1966 | Hyde | 310/156 |

FOREIGN PATENTS OR APPLICATIONS

| | | | |
|---|---|---|---|
| 841,357 | 7/1960 | Great Britain | 310/164 |

Primary Examiner—D. F. Duggan
Attorney—George W. Price and Charles J. Worth

[57] ABSTRACT

A synchronous A.C. motor having two sets of stator poles disposed in circular spaced alternate series, a rotor disposed therein with alternate pole areas equal in number to the stator poles which provide two paths for rotor flux when the motor is quiescent, and the stator poles being made such that the normally lesser dominent flux path is dominent causing the rotor to assume a desired starting position while not causing imbalance when the motor is operated.

8 Claims, 6 Drawing Figures

Patented July 17, 1973 3,746,900

3 Sheets-Sheet 1

Patented July 17, 1973  3,746,900

3 Sheets-Sheet 2

Patented July 17, 1973  3,746,900

3 Sheets-Sheet 3

SYNCHRONOUS MOTOR WITH IMPROVED STARTING CHARACTERISTICS

This invention relates generally to synchronous A.C. permanent magnet motors and more particularly to means for improving the starting characteristics of such motors.

Synchronous A.C. motors of this type having one or two pole pieces each providing a set of salient stator poles are not new in the art. It has been here-to-fore realized that a motor of this type with two pole pieces will have a greater running torque output than will a corresponding motor with only one pole piece. On the other hand, the motor with only one pole piece has a starting advantage over a corresponding motor with two pole pieces.

There have been many and varied modifications proposed for both one and two pole piece motors in an effort to derive the benefits of both forms of motors. While a number of these proposals attained some degree of operating success, higher costs, new difficulties in manufacture and increased malfunctions were usually incurred. One form of modification which has been extensively explored is to vary the spacing of or to remove one or several stator poles or rotor pole areas. Although improved starting characteristics have been realized with relatively little loss of output torque, an imbalance of forces on the rotor results which causes excessive bearing wear.

Accordingly, an object of the present invention is to provide a synchronous A.C. motor having a permanent magnet rotor with two stator pole pieces having improved starting characteristics.

Another object of the present invention is to provide the foregoing motor without creating an imbalance of forces acting on the rotor during motor operation.

And another object of the present invention is to provide the foregoing motor with improved starting characteristics without substantial loss of output torque.

The foregoing and other objects and advantages will appear more fully hereinafter from a consideration of the detailed description which follows, taken together with the accompanying drawing wherein several embodiments of the invention are illustrated by way of example. It is to be expressly understood, however, that the drawings are for illustration purposes only and are not to be construed as defining the limits of the invention.

Figure 2:
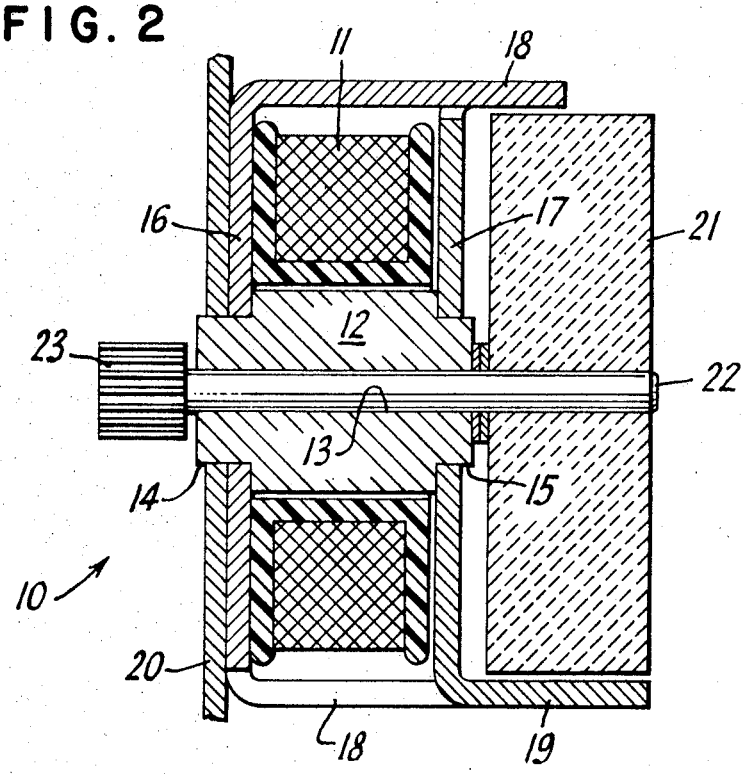
Figure 3:
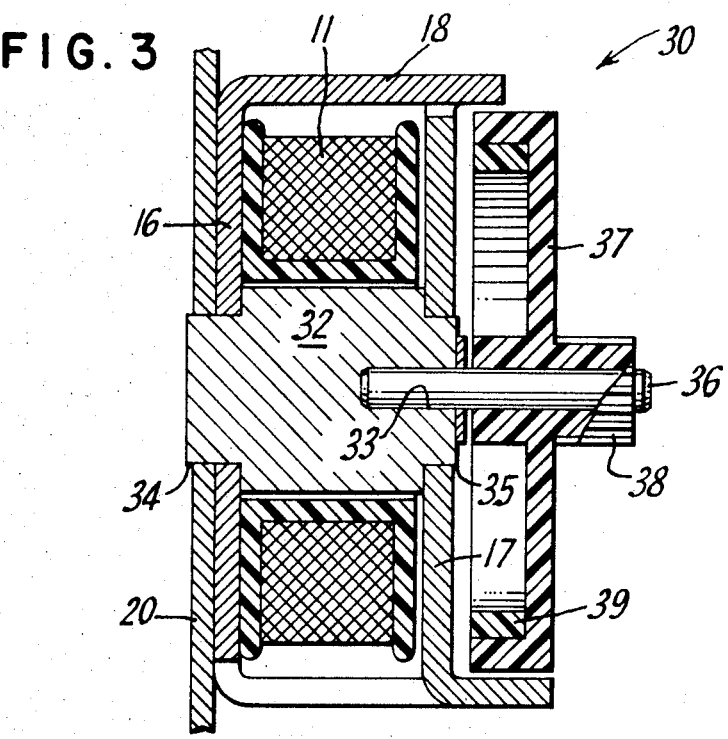
Figure 4:
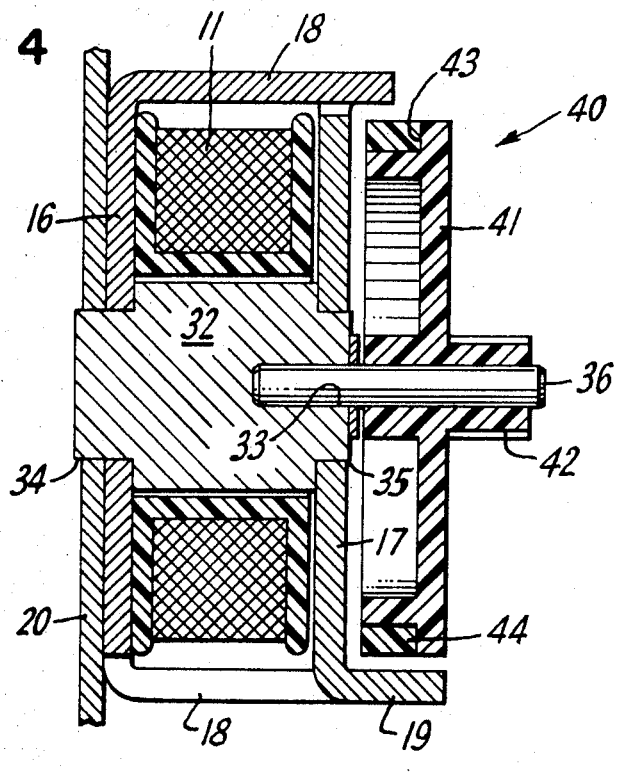
Figure 5:
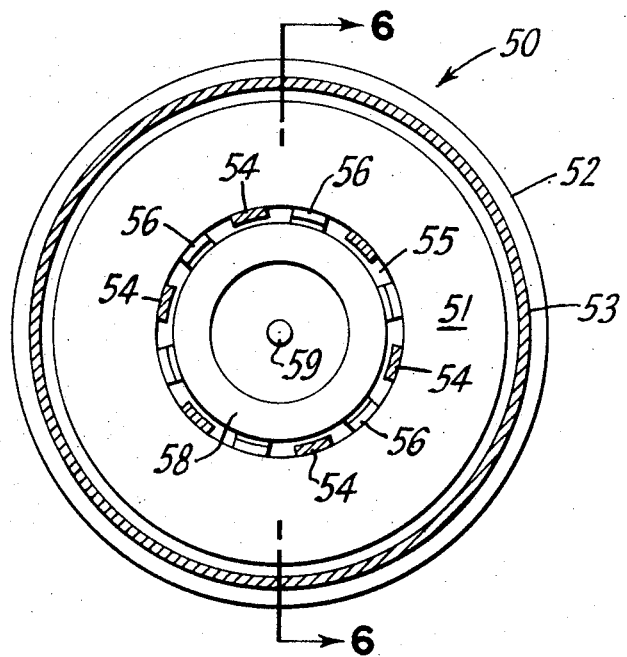
Figure 6:
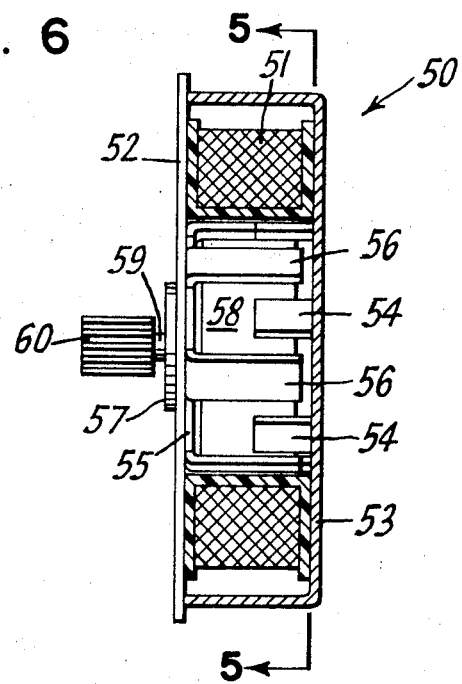

FIG. 1 is an end elevational view, looking at the rotor end of a motor with its case removed, made in accordance with the present invention, FIG. 2 is a sectional view taken on line 2—2 of FIG. 1, FIGS. 3 and 4 are sectional views similar to FIG. 2, each illustrating a different motor made in accordance with the present invention, FIG. 5 is an end elevational view similar to FIG. 1, looking at the rotor end of still another motor along the plane 5-5 of FIG. 6, and FIG. 6 is a sectional view taken on line 6—6 of FIG. 5 with portions thereof being selectively shown in elevation.

Referring now to the drawings and particularly to FIGS. 1 and 2, a motor 10 made in accordance with the present invention is provided with an annular stator coil 11 and a core or core member 12 of magnetic material disposed within the coil. The core 12 is provided with an axial opening or through bore 13 and reduced end portions 14 and 15 which extend outwardly from opposite sides of the coil 11.

A pair of cup shaped pole pieces 16 and 17 of a suitable magnetic material have disc-like bases with a circular series of spaced stator poles or pole fingers 18 and 19, respectively. The pole pieces 16 and 17 are mounted on the reduced ends 14 and 15, respectively, in such a manner that the poles 18 and 19, which are of equal width and spacing, are parallel to one another and extend in the same direction from the base portions of their respective pole pieces with the poles of each of the pole pieces disposed in the spaces between the poles of the other pole piece. A wall 20, the only portion of the motor casing or housing shown, is mounted on the reduced end 14 on the side of the pole piece 16 opposite from the stator poles 18 and 19.

The circular series of equally spaced alternate stator poles 18 and 19 with the disc-like base portion of the pole piece 17 form a circular pocket for a rotor 21 mounted on one end of a shaft 22 which extends through the opening 13 of the core 12 and is rotatably supported thereby. A motor output or drive gear 23 is mounted on the other end of shaft 22 opposite from the rotor 21.

The rotor 21, in this instance, is preferably of a ceramic type permanent magnet which is polarized at its periphery to provide a series of alternate North and South pole areas. The rotor pole areas are all of equal size and are equal in number to the combined or total number of stator poles 18 and 19, as shown in FIG. 1.

All of the stator poles 18 are of equal length and extend along or lap only part of the axial thickness of the rotor 21 as shown in FIG. 2. All of the stator poles 19 are also equal but of a different length than the poles 18 and extend along or lap substantially the full axial thickness of the rotor 21.

Two pole permanent magnet motors inherently have poor starting characteristics due to the rotor pole/stator pole static or non-polarized relationship which is a function of rotor cogging. Rotor cogging, in turn, is dependent on the flux path or paths presented to the rotor poles by the stator pole configuration.

In double or two pole permanent magnet motors with equal numbers or rotor and stator poles, there are two flux paths for the rotor pole flux. The normally predominent flux path is from the rotor poles of one polarity, across the annular gap around the rotor, the stator poles of one pole piece, the core, the stator poles of the other pole piece, across the annular gap, and to the rotor poles of the opposite polarity. This normally causes the rotor pole areas to align with the stator poles thereby putting the rotor in an equilibrium position. The second and less dominent path is where the stator poles provide flux paths between adjacent rotor poles of opposite polarity. With this condition present, the rotor poles align with the stator poles when the motor is quiescent or in its static condition. Therefore, the rotor in substantially an equilibrium position causes starting difficulties.

The ideal position of the rotor for starting is to have each rotor pole aligned with a gap between adjacent stator poles and thereby straddling two adjacent stator poles when the motor is quiescent or in its static condition as shown in FIG. 1. This can be accomplished by making the second or less dominent flux path dominent.

To do this in accordance with the present invention, the normally predominent flux path is weakened, increasing its magnetic reluctance, by removal of some of the ferrous or magnetic material from that flux path.

This is effectively done by providing a shorter set of stator poles, in this instance poles 18, which extend along or lap only a portion of the axial thickness of the polarized periphery or pole areas of the rotor 21.

By providing this stator pole configuration the rotor 21 assumes a substantially ideal starting position, as shown in FIG. 1, thereby providing the motor 10 with starting characteristics similar to a permanent magnet synchronous motor with but a single set of stator poles. While a limited amount of output torque loss is realized because of the reduced flux path between the stator poles 18 and the polarized periphery of the rotor 21, the torque output is substantially greater than would be realized by an equivalent motor with but a single set of stator poles.

Because the stator poles 18 are evenly dispersed around the rotor 21, there is no imbalance of forces on the rotor 21 when the coil 11 is energized as is normally realized when one or several rotor poles are removed.

The present invention is not limited to the motor construction of FIGS. 1 and 2. As shown in FIG. 3, a modified core 32 replaces core 12 and has reduced end portions 34 and 35 corresponding to the reduced end portions 14 and 15, respectively. The core 32 has a blind bore 33 for receiving and supporting a fixed shaft 36. A cup-shaped rotor 37, preferably of a molded plastic, with an integral motor output gear 38 is rotatable on the fixed shaft 36. A plastic permanent magnet material in strip form, such as the material known by the commercial name "Plastiform," is deformed and snapped into the rotor cup 37 to provide the permanent rotor magnet 39. The rotor magnet 39 is suitably polarized to provide the alternate North and South pole areas corresponding to such pole areas of the rotor 21 of motor 10.

Referring to FIG. 4, a motor 40 is shown which is substantially the same as the motor 30 except for the rotor. The motor 40 has a cup-shaped rotor 41 with an integral gear 42 corresponding to the rotor 37 and its gear 38. In this instance, the rotor 41 is provided with an external annular recess 43 to receive the annular permanent rotor magnet 44. If the rotor 37 were made smaller in diameter, in accordance with the foregoing teachings, the annular permanent magnet 44 could be fixedly connected to the outer surface of the rotor flange.

A motor 50 of a more compact construction can also be made in accordance with the present invention, as shown in FIGS. 5 and 6. Motor 50 is provided with a coil 51 enclosed in a case formed by a plate 52 and a cover 53, both made of a magnetic material. Although a separate pole piece could be used, the cover 53 provides a plurality of short stator poles 54 which correspond to the stator poles 18 of the motor 10. The stator poles 54 are disposed within the coil 51 and extend towards the plate 52.

Pole piece 55 is mounted on a bearing member 57 supported by the plate 52, thus effectively joining the plate 52 and the pole piece 55 together. The pole piece 55 has a series of long stator poles 56 which correspond to the poles 19 of the motor 10. The stator poles 56 are disposed within the coil 51 and extend toward the cover 53. The cover 53 and pole piece 55 are oriented so that one set of stator poles is aligned with the gaps between the other stator poles. Therefore, the stator poles 54 and 56 are disposed alternately in spaced circular series. A suitable permanent magnet rotor 58, disposed within the circular series of stator poles 54 and 56, is mounted on a shaft 59 which is rotatably supported by the bearing 59 and is provided with a motor output gear 60, as shown.

Although several embodiments of the invention have been illustrated and described in detail, it is to be expressly understood that the invention is not limited thereto. Various changes may be made in the design and arrangement of the parts without departing the spirit and scope of the invention as the same will now be understood by those skilled in the art.

I claim:

1. In a synchronous A.C. motor, the combination comprising
    a permanent magnet rotor having a plurality of pole areas at its periphery each being of the opposite polarity to the adjacent pole areas,
    a stator having a pair of magnetically coupled pole pieces each one with a plurality of spaced stator poles equal in length and width,
    the stator poles of each of said pole pieces extending into spaces between the stator poles of said other pole piece and the stator poles of the two pole pieces being arranged in a circular series of equally spaced stator poles encircling said rotor and being equal in number to the rotor pole areas,
    said stator poles lapping the periphery of said rotor to provide paths for rotor flux,
    the stator poles of one of said pole pieces lapping the periphery of said rotor by a shorter extent than the stator poles of the other one of said pole pieces, thereby providing means for causing said rotor to assume a predetermined starting position when the motor is quiescent.

2. A synchronous A.C. motor in accordance with claim 1, and
    said rotor being a disc of ceramic permanent magnet material.

3. A synchronous A.C. motor in accordance with claim 1, and said rotor comprising
    a rotor cup having a peripheral flange, and
    a permanent magnet of deformable material disposed in said cup substantially against the flange thereof.

4. A synchronous A.C. motor in accordance with claim 1, and said rotor comprising
    a rotor cup having a peripheral flange, and
    an annular permanent magnet encircling said peripheral flange.

5. A synchronous A.C. motor in accordance with claim 4, and
    a permanent magnet of deformable material being wrapped around and connected to said peripheral flange providing said annular permanent magnet.

6. A synchronous A.C. motor in accordance with claim 1 wherein
    said stator further having a core of magnetic material and a coil encircling said core, and
    said pole pieces being connected to opposite ends of said core with all of said stator poles extending in the same axial direction from said pole pieces.

7. A synchronous A.C. motor in accordance with claim 1 wherein said motor having a casing of magnetic material and an annular coil disposed in said casing, said pole pieces being disposed on opposite sides of said coil, and said stator poles of each pole piece being disposed within said coil and extending axially toward the other pole piece.

8. A synchronous A.C. motor in accordance with claim 3 wherein said case has a cover formed to provide one of said pole pieces and the stator poles thereof.

* * * * *